H. B. ESTY.
Spruce-Gum Purifier.
No. 57,304. Patented Aug. 21, 1866.
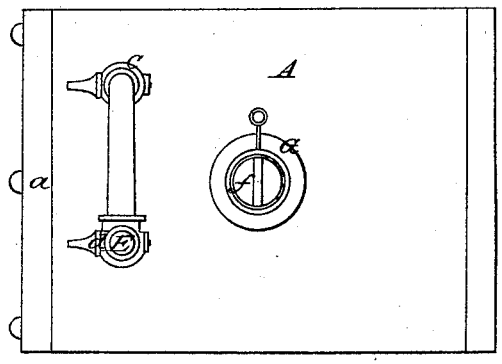
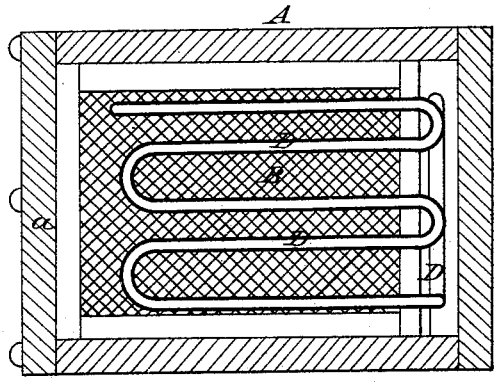
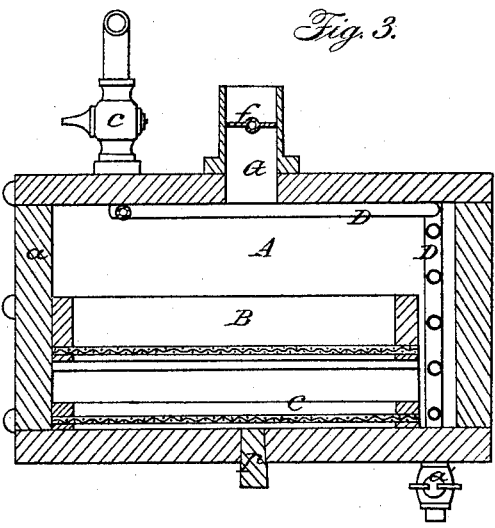

UNITED STATES PATENT OFFICE.

HIRAM B. ESTY, OF HOULTON, MAINE.

IMPROVED PROCESS OF PURIFYING SPRUCE-GUM.

Specification forming part of Letters Patent No. 57,304, dated August 21, 1866.

*To all whom it may concern:*

Be it known that I, HIRAM B. ESTY, of Houlton, in the county of Aroostook, of the State of Maine, have made a new and useful Invention having reference to the Purification of Spruce-Gum, and which may also be used to advantage in purifying various other resinous gums; and I do hereby declare the same to be fully described in the following specification, reference being had to the accompanying drawings, which exhibit the apparatus used by me in carrying out my said invention—

Figure 1 being a top view, Fig. 2 a horizontal section, and Fig. 3 a vertical section, of such apparatus.

My mode of purifying the gum involves not only the employment of a close box or chamber and one or more sieves arranged therein, but that of heat introduced into such chamber by means of one or more pipes. In one case the heat may be let into the chamber by carrying hot air from a furnace into the chamber by a pipe from such furnace, or such air may be caused to circulate through a pipe led through the chamber, and so as to cause heat to be radiated from the pipe into the chamber. In another case steam may be caused to pass through such a pipe. In another case I let the steam directly into the chamber and upon the gum when placed on the upper sieve, by which means I have found the gum to be bleached or improved by the steam otherwise than having foreign matters extracted from it.

In the drawings, A denotes a close box, whose end *a* is secured in place by screws, which admit of its being removed for the introduction of gum upon the upper sieve.

B and C are two sieves or strainers, made of wire or other suitable material arranged horizontally in the box, one being made with larger meshes than the other and arranged over it.

A coiled or serpentine pipe, D, runs along within the box against its top and one end, and has a stop-cock, $a'$, at its lower end, where it extends out of the box. It also has another stop-cock, *c*, in that part of it which is above the box.

The pipe D leads out of another pipe, E, which opens into the top of the box, and is provided with a stop-cock, *d*, such pipe E being supposed to communicate with a steam-generator.

When hot air only is to be used in the gum the box may be furnished with a pipe, G, to lead from a hot-air furnace, and have a damper, *f*, within it.

The gum, in its crude state, is to be laid upon the upper sieve. When the air in the interior of the chamber is properly heated the gum will be melted, and will run through the sieves and separate from the dirt and foreign matters, which will be left on the sieves. The gum falling on the bottom of the chamber may be drawn therefrom by taking out a plug, *p*, from a hole in such bottom. When steam is let into the chamber it will melt the gum and bleach or decolorize it more or less.

The condensed water may be extracted through the plug-hole or by any other proper means.

The advantage of the close chamber over an open vessel is very great, as when the gum is melted in a kettle and strained by a sieve much of the aromatic quality and spirit of the gum are lost, whereas by the close vessel they are retained in it, and, besides, with the close vessel the saving of fuel and heat is very great to effect a like result.

With the close vessel we can use steam to heat and melt the gum, and also to decolorize it.

I claim—

1. The above-described mode of purifying resinous gum, the same being by means of a close chamber and one or more sieves therein, and by heat introduced within such chamber by means substantially as described.

2. The apparatus for effecting the purification of a resinous gum, the same consisting of the close chamber or vessel, one or more sieves placed therein, and a means of introducing heat into such chamber, the whole being substantially as specified.

3. For the purification of a resinous gum, the employment of steam in the close chamber, with one or more sieves or strainers arranged therein for straining the gum when melted and subjected to the action of the steam.

HIRAM B. ESTY.

Witnesses:
R. H. EDDY,
F. P. HALE, Jr.